(12) United States Patent
Kamiyama (10) Patent No.: US 10,797,328 B2
(45) Date of Patent: Oct. 6, 2020

(54) FUEL CELL MODULE

(71) Applicant: TOYOTA JIDOSHA KABUSHIKI KAISHA, Toyota-shi, Aichi-ken (JP)

(72) Inventor: Atsushi Kamiyama, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 217 days.

(21) Appl. No.: 16/161,774

(22) Filed: Oct. 16, 2018

(65) Prior Publication Data

US 2019/0123365 A1  Apr. 25, 2019

(30) Foreign Application Priority Data

Oct. 20, 2017  (JP) .................................. 2017-203803

(51) Int. Cl.
| | | |
|---|---|---|
| *H01M 8/04119* | (2016.01) | |
| *H01M 8/0247* | (2016.01) | |
| *H01M 8/04029* | (2016.01) | |
| *H01M 8/04089* | (2016.01) | |
| *H01M 8/04223* | (2016.01) | |

(52) U.S. Cl.
CPC ..... *H01M 8/04164* (2013.01); *H01M 8/0247* (2013.01); *H01M 8/04029* (2013.01); *H01M 8/04097* (2013.01); *H01M 8/04253* (2013.01)

(58) Field of Classification Search
None
See application file for complete search history.

(56) References Cited

U.S. PATENT DOCUMENTS 5,683,116 A * 11/1997 Folkers .................. F16L 37/08
285/18
2007/0266731 A1* 11/2007 Hirota ................... F25B 41/062
62/527

FOREIGN PATENT DOCUMENTS

| JP | 2005-353402 | 12/2005 |
|---|---|---|
| JP | 2008-057949 | 3/2008 |
| JP | 2015-017551 | 1/2015 |

* cited by examiner

*Primary Examiner* — Rena Dye Cronin
(74) *Attorney, Agent, or Firm* — Finnegan, Henderson, Farabow, Garrett & Dunner, LLP (57) ABSTRACT

A fuel cell module that can suppress deterioration of sealability caused by liquid (water) that has collected in a system is provided. In the fuel cell module, a port portion of a gas-liquid separator is provided with a discharge groove in a region of from the outer periphery toward the inner periphery of the port portion, and the bottom portion of the discharge groove is inclined so as to become lower toward the inner side. Liquid (water) that is stuck between the port portion and a housing portion is discharged, due to its own weight or the like, to the inside of the port portion (to the side of the gas-liquid separator) through the discharge groove.

5 Claims, 6 Drawing Sheets

FUEL CELL MODULE

CROSS REFERENCE TO RELATED APPLICATIONS

The present application claims priority from Japanese patent application JP 2017-203803 filed on Oct. 20, 2017, the content of which is hereby incorporated by reference into this application.

BACKGROUND

Technical Field

The present disclosure relates to a fuel cell module.

Background Art

There have conventionally been known fuel cell systems that include fuel cells (a fuel cell stack) that generate electricity through electrochemical reactions of reactant gases, between an oxidant gas such as air and a fuel gas such as hydrogen.

In the fuel cell system of this type, upon termination of the operation of the fuel cells, scavenging treatment (purge treatment) is typically performed by controlling the components of the fuel cell system so as to reduce water remaining in the fuel cells or being stuck to pipes, valves, and the like of the fuel cell system. This reduces the amount of water inside the fuel cells in a fuel-cell vehicle, so that excellent start-up performance is ensured even in a low temperature environment.

However, even when such a scavenging treatment (purge treatment) is performed, water still remaining after scavenging, remaining water from the fuel cells (the fuel cell stack), water resulting from dew concentration, and the like occasionally remain in the fuel cell system.

Figure 6:
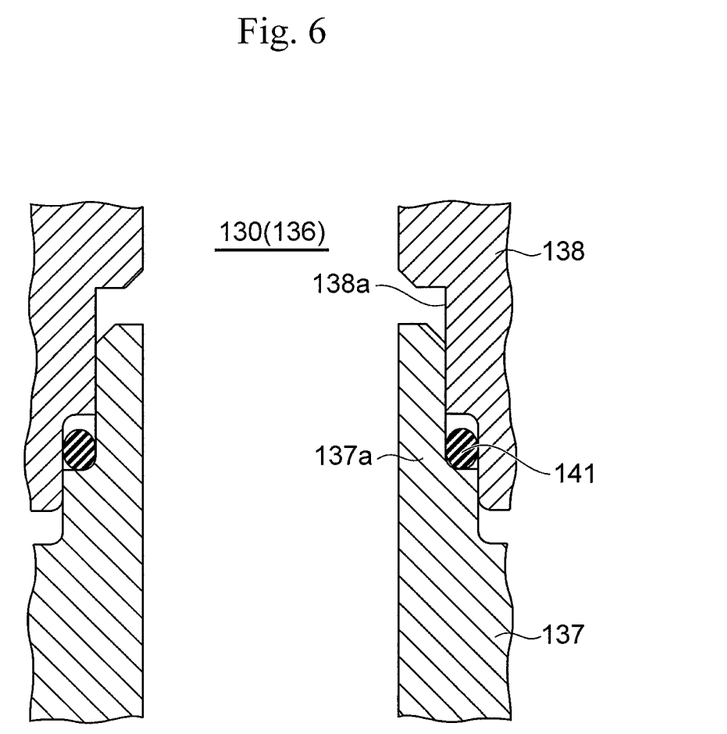
FIG. 6 is an enlarged cross-sectional view of the main part of a conventional example of the portion where the gas-liquid separator and the circulation pump are coupled to each other in a fuel cell system.

FIG. 6 shows an example of the configuration of coupling between a gas-liquid separator 137 and a circulation pump (a hydrogen pump) 138 that are provided in a circulation channel 136 of a fuel gas supply system 130 of the fuel cell system.

As shown in FIG. 6, in the circulation channel 136, typically, a substantially cylindrical port portion 137a, which projects upward, of the gas-liquid separator 137 is inserted into a housing portion 138a, which opens downward, of the circulation pump 138, and an O-ring 141 as a sealing member is disposed in a portion where the port portion 137a and the housing portion 138a are coupled to each other, specifically, between the outer periphery of the port portion 137a and the inner periphery of the housing portion 138a, so as to define a channel that connects the gas-liquid separator 137 and the circulation pump 138 (see also JP 2005-353402 A, for example). Therefore, water tends to collect in the portion of the circulation channel 136 where the gas-liquid separator 137 and the circulation pump 138 are coupled to each other, that is, a portion between the port portion 137a on the side of the gas-liquid separator 137 and the housing portion 138a on the side of the circulation pump 138 (in particular, a side above the O-ring 141 disposed therebetween).

SUMMARY

Liquid (basically, water) that has collected in the aforementioned portion where the port portion and the housing portion are coupled to each other is cooled to be frozen by the outer air at a temperature below zero and gets dry during the operation. Such wet conditions are repeated until the end of vehicle life. Fuel gas (fuel off-gas) discharged from anode electrodes of fuel cells may contain water and impurities from the fuel cells, and thus, when such wet conditions are repeated, liquid gradually condenses with the pH level gradually lowering (that is, becoming more acidic) in the portion where the port portion and the housing portion are coupled to each other, and with the result that rust is generated, leakage may possibly occur in that portion. Further, due to gradually growing frozen liquid (ice), the sealability may also possibly deteriorate.

The present disclosure has been made in view of the aforementioned problem, and provides a fuel cell module that can suppress deterioration of the sealability caused by liquid (water) that has collected inside the system.

To solve the aforementioned problem, the fuel cell module according to the present disclosure includes a gas-liquid separator and a circulation pump that are disposed in a circulation channel for refluxing fuel off-gas discharged from fuel cells to the fuel cells, the gas-liquid separator having a cylindrical port portion that projects upward from the gas-liquid separator, the circulation pump having a housing portion that opens downward, the cylindrical port portion being adapted to be inserted into the housing portion so as to define a channel through which the fuel off-gas flows between the gas-liquid separator and the circulation pump, in which the port portion is provided with a discharge groove or a discharge hole in a region of from an outer periphery toward an inner periphery of the port portion, and a bottom portion of the discharge groove or the discharge hole is inclined so as to become lower toward an inner side.

In some embodiments, the port portion has a cylindrical shape, and the discharge groove or the discharge hole is disposed radially in the port portion.

In some embodiments, a sealing member adapted to seal between the port portion and the housing portion is disposed in a housing space formed between the port portion and the housing portion, and the discharge groove or the discharge hole is disposed in a region of from a portion above the housing space on the outer periphery of the port portion toward the inner periphery of the port portion.

In some embodiments, the discharge groove or the discharge hole includes a plurality of discharge grooves or discharge holes that are disposed circumferentially in the port portion.

In some embodiments, the housing portion of the circulation pump is made of metal and the port portion of the gas-liquid separator is made of resin.

According to the present disclosure, liquid (water) that is stuck between the port portion and the housing portion is discharged, due to its own weight or the like, to the inside of the port portion (to the side of the gas-liquid separator) through the discharge groove or the discharge hole, and thus becomes unlikely to collect in a portion between the port portion and the housing portion, and also, rust can be prevented from being generated in the portion where the port portion and the housing portion are coupled to each other. Therefore, the sealability can be ensured.

Further, the discharge groove or the discharge hole for discharging liquid (water) that is stuck between the port portion and the housing portion does not communicate with the housing space that houses the sealing member therein, so that liquid (water) can be prevented from being stuck to the sealing member. This can also prevent deterioration of the sealability.

DETAILED DESCRIPTION

The configuration of the present disclosure will be described below in detail based on an example of an embodiment shown in the drawings. As an example of the present disclosure, fuel cells or a fuel cell system including them to be mounted on a fuel cell vehicle will be described, but the range of application of the present disclosure is not limited thereto.

Figure 1:
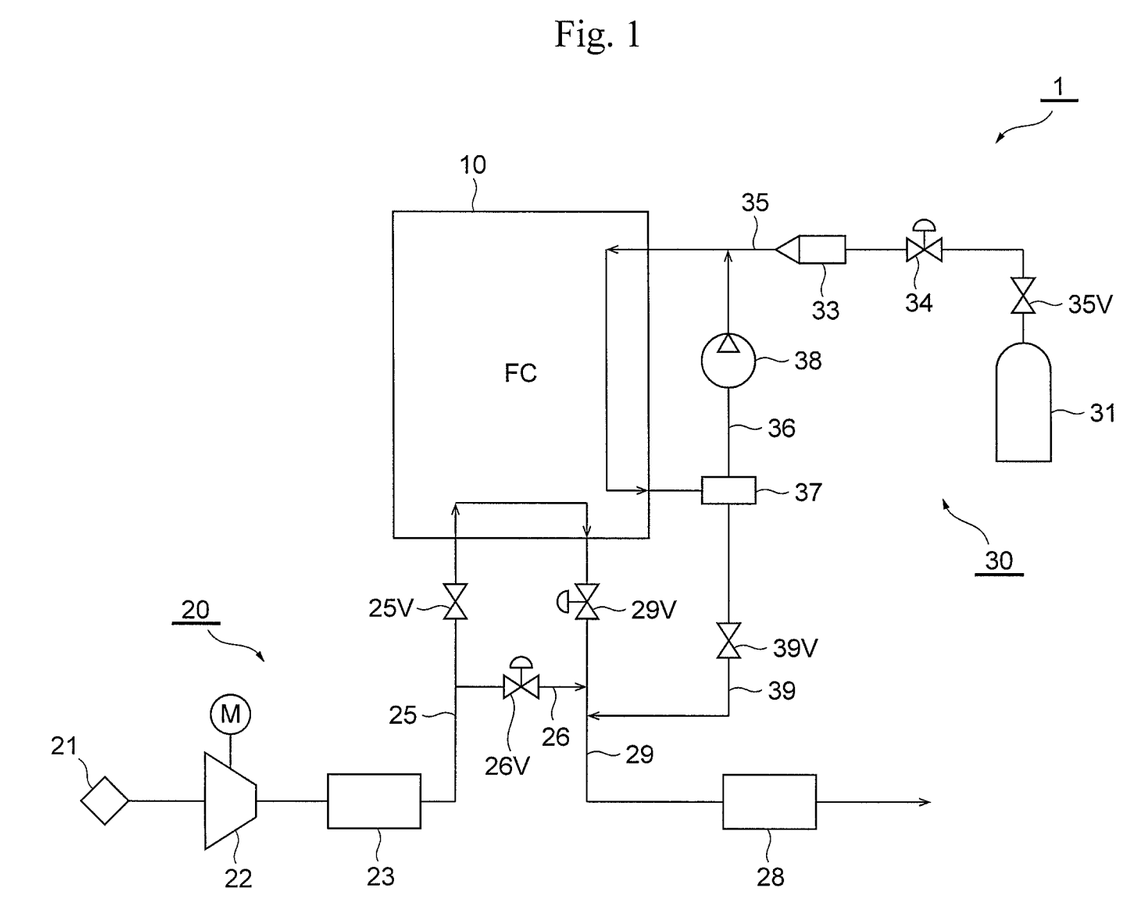
FIG. 1 is a system configuration diagram of a fuel cell system including a fuel cell module according to the present disclosure.

First, the system configuration of a fuel cell system including fuel cells according to the present disclosure will be outlined with reference to FIG. 1.

A fuel cell system 1 shown in FIG. 1 includes, for example, fuel cells (a fuel cell stack) 10 formed by stacking a plurality of fuel cells, each cell being a unit cell, an oxidant gas supply system 20 that supplies an oxidant gas such as air to the fuel cells 10, and a fuel gas supply system 30 that supplies a fuel gas such as hydrogen to the fuel cells 10.

For example, each of the fuel cells 10 as a polymer electrolyte fuel cell has a membrane electrode assembly (MEA) that includes an electrolyte membrane with ion permeability and anode-side catalyst layer (anode electrode) and cathode-side catalyst layer (cathode electrode) sandwiching the electrolyte membrane therebetween. The MEA has gas diffusion layers (GDLs) on opposite sides thereof for providing a fuel gas or an oxidant gas to the MEA and for collecting electricity generated through electrochemical reactions. Such a membrane electrode assembly having GDLs on opposite sides thereof is referred to as a MEGA (Membrane Electrode & Gas Diffusion Layer Assembly), and the MEGA is sandwiched between a pair of separators. Herein, the MEGA is a power generation portion of the fuel cell. If no gas diffusion layers are provided, the MEA is the power generation portion of the fuel cell.

The oxidant gas supply system 20 includes, for example, an oxidant gas supply channel (pipe) 25 for supplying an oxidant gas to the fuel cells 10 (or the cathode electrodes thereof), an oxidant gas discharge channel (pipe) 29 for discharging, from the fuel cells 10, an oxidant off-gas that is produced after the oxidant gas is used for an electrochemical reaction in each fuel cell, and a bypass channel 26 for circulating the oxidant gas supplied through the oxidant gas supply channel 25 to the oxidant gas discharge channel 29 by bypassing the fuel cells 10. Each channel of the oxidant gas supply system 20 may be made of, for example, a rubber hose or a metal pipe.

The oxidant gas supply channel 25 is provided with an air cleaner 21, an air compressor (a turbo compressor; hereinafter simply referred to as a compressor) 22, an intercooler 23, and the like that are arranged in this order from the upstream side, and the oxidant gas discharge channel 29 is provided with a muffler 28 and the like. It should be noted that the oxidant gas supply channel 25 (or the air cleaner 21 thereof) is provided with, for example, an atmospheric pressure sensor and/or an air flow meter (which are not shown).

In the oxidant gas supply channel 25, the air cleaner 21 removes dust in the oxidant gas (such as air) to be taken in from the atmosphere.

The compressor 22 compresses the oxidant gas introduced via the air cleaner 21 and pressure-feeds the compressed oxidant gas to the intercooler 23.

When the oxidant gas that has been pressure-fed and introduced from the compressor 22 passes through the intercooler 23, the intercooler 23 cools the oxidant gas through heat exchange with a refrigerant, for example, and supplies the cooled oxidant gas to the fuel cells 10 (or the cathode electrodes thereof).

Further, the oxidant gas supply channel 25 is provided with an inlet valve 25V for blocking an oxidant gas flow between the intercooler 23 and the fuel cells 10. It should be noted that the inlet valve 25V may be a check valve that is configured to open by the flow of the oxidant gas moving from the intercooler 23 toward the fuel cells 10 and thus allow the passage of the oxidant gas, and to close by the flow of the oxidant gas moving from the fuel cells 10 toward the intercooler 23 and thus block the passage of the oxidant gas.

The bypass channel 26 is connected to the oxidant gas supply channel 25 (or the intercooler 23 thereof or the downstream of the intercooler 23) at one end thereof, and to the oxidant gas discharge channel 29 at the other end thereof. In other words, the bypass channel 26 branches from the oxidant gas supply channel 25 (or the intercooler 23 thereof or the downstream of the intercooler 23) toward the oxidant gas discharge channel 29 and is connected thereto. In the bypass channel 26, the oxidant gas that has been pressure-fed by the compressor 22, cooled by the intercooler 23, and then discharged flows toward the oxidant gas discharge channel 29 by bypassing the fuel cells 10. The bypass channel 26 is provided with a bypass valve 26V for regulating the flow rate of the oxidant gas flowing through the bypass channel 26 by blocking the oxidant gas flowing toward the oxidant gas discharge channel 29.

In the oxidant gas discharge channel 29, the muffler 28 separates the oxidant off-gas (exhaust gas) flowing through the oxidant gas discharge channel 29 into, for example, gas and liquid phases so as to be discharged to the outside.

Further, the oxidant gas discharge channel 29 is provided with a pressure regulating valve 29V for regulating the back pressure of the oxidant gas supplied to the fuel cells 10. The aforementioned bypass channel 26 is connected to the downstream side of the pressure regulating valve 29V.

Meanwhile, a fuel gas supply system 30 includes, for example, a fuel gas supply source 31 such as a hydrogen tank that stores a high-pressure fuel gas such as hydrogen, a fuel gas supply channel (pipe) 35 for supplying the fuel gas fed from the fuel gas supply source 31 to the fuel cells 10 (or the anode electrodes thereof), a circulation channel 36 for refluxing a fuel off-gas (unconsumed fuel gas) discharged from the fuel cells 10 to the fuel gas supply channel 35, and a fuel gas discharge channel (pipe) 39, which branches from the circulation channel 36, for discharging the fuel off-gas inside the circulation channel 36 to the outside (releasing to the air). Each channel of the fuel gas supply system 30 may be made of, for example, a rubber hose or a metal pipe.

The fuel gas supply channel 35 is provided with, for example, a pressure gauge (not shown) for measuring the fuel gas pressure, and also with a shut-off valve 35V for blocking the fuel gas flowing toward the fuel cells 10 by opening and closing the fuel gas supply channel 35, a regulator 34 for regulating (reducing) the pressure of the fuel gas flowing through the fuel gas supply channel 35, and an injector 33 for supplying the fuel gas with its pressure regulated to the fuel cells 10. When the shut-off valve 35V is opened, the high-pressure fuel gas stored in the fuel gas supply source 31 flows out to the fuel gas supply channel 35, and is supplied to the fuel cells 10 (or the anode electrodes thereof) with its pressure regulated (reduced) by the regulator 34 and the injector 33.

The circulation channel 36 is provided with a gas-liquid separator 37, a circulation pump (also referred to as a hydrogen pump) 38, and the like that are arranged in this order from the upstream side (side of the fuel cells 10).

The gas-liquid separator 37 separates the fuel gas (such as hydrogen), which contains produced water therein, flowing through the circulation channel 36 into gas and liquid and stores them. A fuel gas discharge channel 39 is provided so as to branch from the gas-liquid separator 37.

The circulation pump 38 pressure-feeds the fuel off-gas, which has been produced through the gas-liquid separation by the gas-liquid separator 37, to the fuel gas supply channel 35 to be circulated therethrough.

The fuel gas discharge channel 39 is provided with a purge valve 39V that is adapted to open and close the fuel gas discharge channel 39 so as to discharge the produced water, which has been separated from the fuel gas by the gas-liquid separator 37, and some of the fuel off-gas discharged from the fuel cells 10.

The fuel off-gas discharged through the adjustment of opening and closing of the purge valve 39V of the fuel gas discharge channel 39 is mixed with the oxidant off-gas flowing through the oxidant gas discharge channel 29 and then released to the air outside via the muffler 28.

In the fuel cell system 1 with the aforementioned configuration, electricity is generated through electrochemical reactions between an oxidant gas such as air supplied to the fuel cells 10 (or the cathode electrodes thereof) through the oxidant gas supply system 20 and a fuel gas such as hydrogen supplied to the fuel cells 10 (or the anode electrodes thereof) through the fuel gas supply system 30.

Figure 2:
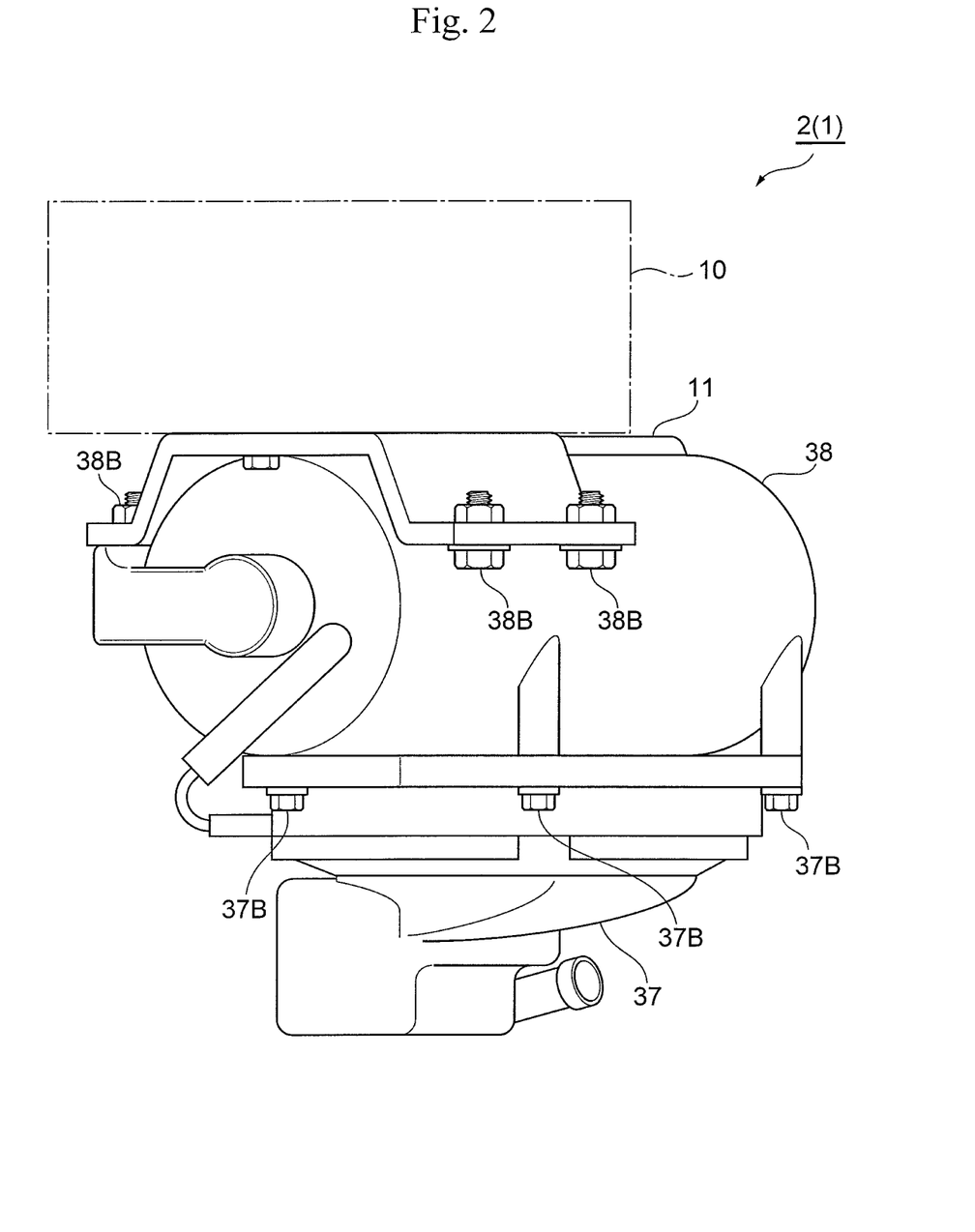
FIG. 2 is a side view of the main portion of the fuel cell system including the fuel cell module according to the present disclosure.

FIG. 2 is a side view of the main portion of the fuel cell system including the fuel cell module according to the present disclosure.

The following description will be made with emphasis on the characteristic point of the present disclosure, which is the configuration of coupling (connection) between the gas-liquid separator 37 and the circulation pump 38.

A fuel cell module 2 of the fuel cell system 1 of the embodiment shown in the drawing mainly includes the fuel cells (the fuel cell stack) 10 and the gas-liquid separator 37 and circulation pump 38 that are disposed in the fuel gas supply system 30 (or the circulation channel 36 thereof).

The fuel cells 10 are fastened, with fasteners (not shown) such as bolts, to a fuel cell stack frame (hereinafter simply referred to as a stack frame) 11 to be mounted thereon, the stack frame 11 being securely disposed in a front portion of a vehicle, for example.

Meanwhile, the gas-liquid separator 37 and the circulation pump 38 are arranged in tandem below the stack frame 11. Specifically, the circulation pump 38 made of metal such as aluminum is attached to the lower surface of the stack frame 11 with fasteners 38B such as bolts, and the gas-liquid separator 37 made of resin is attached to the lower portion of the circulation pump 38 with fasteners 37B such as bolts.

Figure 3A:
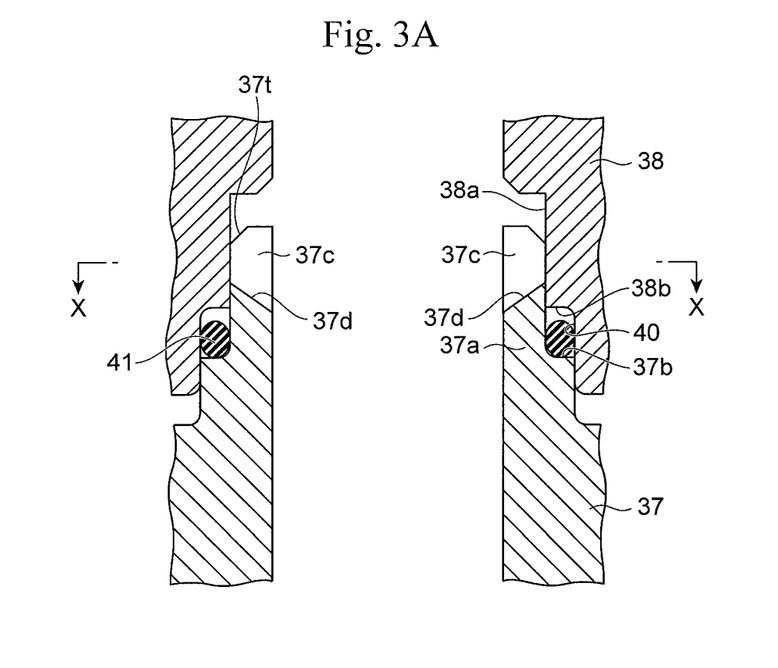
FIG. 3A is an enlarged cross-sectional view of the main part of a portion where a gas-liquid separator and a circulation pump in the fuel cell module of FIG. 2 are coupled to each other.

As can be clearly understood from FIG. 3A, in order to define a channel (a channel through which fuel off-gas flows) that connects the gas-liquid separator 37 and the circulation pump 38, the gas-liquid separator 37 disposed on the lower side has a substantially cylindrical port portion 37a that projects upward from the gas-liquid separator 37 and has an inner channel (a lumen), through which the fuel off-gas that has been produced through the gas-liquid separation flows, and the circulation pump 38 disposed on the upper side has a housing portion 38a with a substantially round cross-section that is large enough to accommodate the substantially cylindrical port portion 37a, the housing portion 38a opening downward. Further, the outer periphery of the port portion 37a is provided with a step portion (an outer periphery step portion) 37b with a terrace surface facing up, and the inner periphery of the housing portion 38a is provided with a step portion (an inner periphery step portion) 38b with a terrace surface facing down.

The port portion 37a provided on the gas-liquid separator 37 is inserted into the housing portion 38a that opens in the circulation pump 38, and an O-ring 41 as a sealing member for sealing between the port portion 37a and the housing portion 38a is disposed (in a compressed state) in an (annular) housing space 40, which is defined by the step portion 37b formed around the outer periphery of the port portion 37a and the step portion 38b formed around the inner periphery of the housing portion 38a, so that the channel that connects the gas-liquid separator 37 and the circulation pump 38 is defined.

It should be noted that in the example shown in the drawing, for enabling smooth insertion of the port portion 37a into the housing portion 38a, the upper outer rim of the port portion 37a is chamfered in a tapered shape (in other words, a chamfered portion 37t with a tapered surface is provided on the upper outer rim of the port portion 37a).

Further, in the present example, in order to discharge liquid (water) that is stuck between the port portion 37a and the housing portion 38a, a slit-like discharge groove 37c is provided in a region of from the outer periphery toward the inner periphery of the upper portion of the port portion 37a (the upper portion with a smaller diameter above the step portion 37b) in the gas-liquid separator 37, and the bottom portion (the bottom surface) 37d of the discharge groove 37c is inclined so as to gradually become lower toward the inner side. That is, the discharge groove 37c is disposed so as to be inclined from the portion above the housing space 40 on the outer periphery of the port portion 37a toward the inner periphery of the port portion 37a. In other words, the housing space 40 (or the O-ring 41 housed therein) is provided at a position lower than the outer edge of the discharge groove 37c.

In the present example, since the angle of inclination of the bottom portion (the bottom surface) 37d of the discharge groove 37c is set to around 30°, liquid (water) that is stuck between the port portion 37a and the housing portion 38a can be effectively discharged downward even when the fuel cells (the fuel cell stack) 10 are inclined to some extent (for example, at around 15°).

Figure 3B:
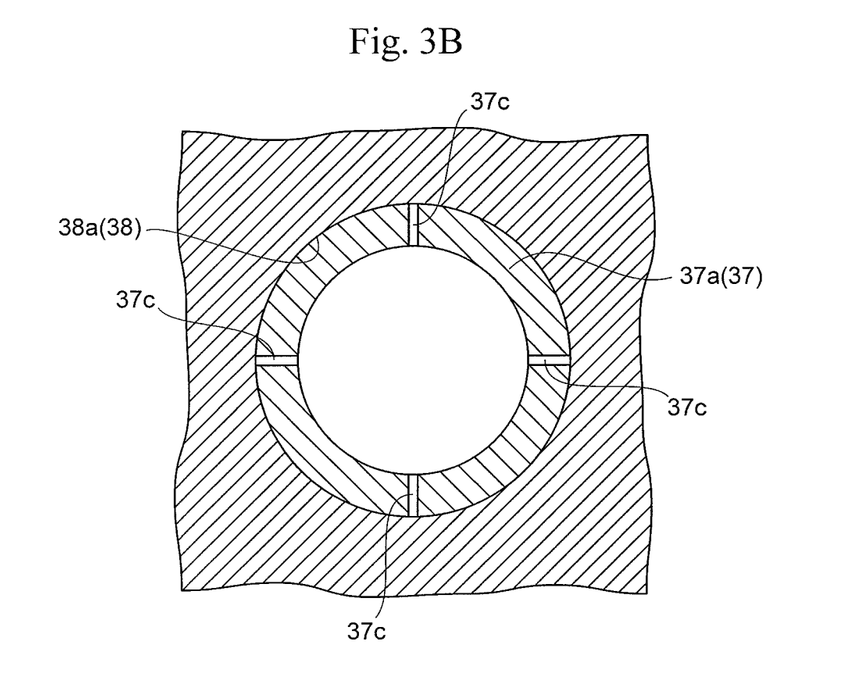
FIG. 3B is a cross-sectional view of the main part of FIG. 3A taken along arrow X-X.

Furthermore, in the present example, a plurality of the discharge grooves 37c are disposed at equiangular intervals (four discharge grooves 37c are disposed at equiangular intervals of 90° in the drawing) circumferentially along the substantially cylindrical port portion 37a (see FIG. 3B).

In the fuel cell module 2 of the present embodiment with the aforementioned configuration, liquid (water) that is stuck between the port portion 37a and the housing portion 38a is discharged, due to its own weight or the like, to the inside of the port portion 37a (to the side of the gas-liquid separator 37) through the discharge grooves 37c, and thus becomes unlikely to collect in a portion between the port portion 37a and the housing portion 38a, and also, rust can be prevented from being generated in the portion where the port portion 37a and the housing portion 38a are coupled to each other. Therefore, the sealability can be ensured.

Moreover, the discharge grooves 37c for discharging liquid (water) that is stuck between the port portion 37a and the housing portion 38a do not communicate with the housing space 40 that houses the O-ring 41 therein, so that liquid (water) can be prevented from being stuck to the O-ring 41. This can also prevent deterioration of the sealability.

It should be noted that in the aforementioned embodiment, the discharge grooves 37c provided in the port portion 37a are disposed radially in the port portion 37a, but it goes without saying that the discharge grooves 37c may be configured as spiral grooves (grooves that are disposed not radially in the port portion 37a), and further that the number of the discharge grooves 37c provided in the port portion 37a is not limited to that of the example shown in the drawing.

Furthermore, in the aforementioned embodiment, in order to discharge liquid (water) that is stuck between the port portion 37a and the housing portion 38a, the discharge grooves 37c with their upper sides open are formed on the upper portion of the port portion 37a, but for example, it is also possible to form discharge holes (through-holes) that are inclined so as to become lower toward the inner side in a region of from the outer periphery toward the inner periphery on the upper portion of the port portion 37a, so that liquid (water) that is stuck between the port portion 37a and the housing portion 38a is discharged to the inside of the port portion 37a (to the side of the gas-liquid separator 37) through the discharge holes.

Figure 4:
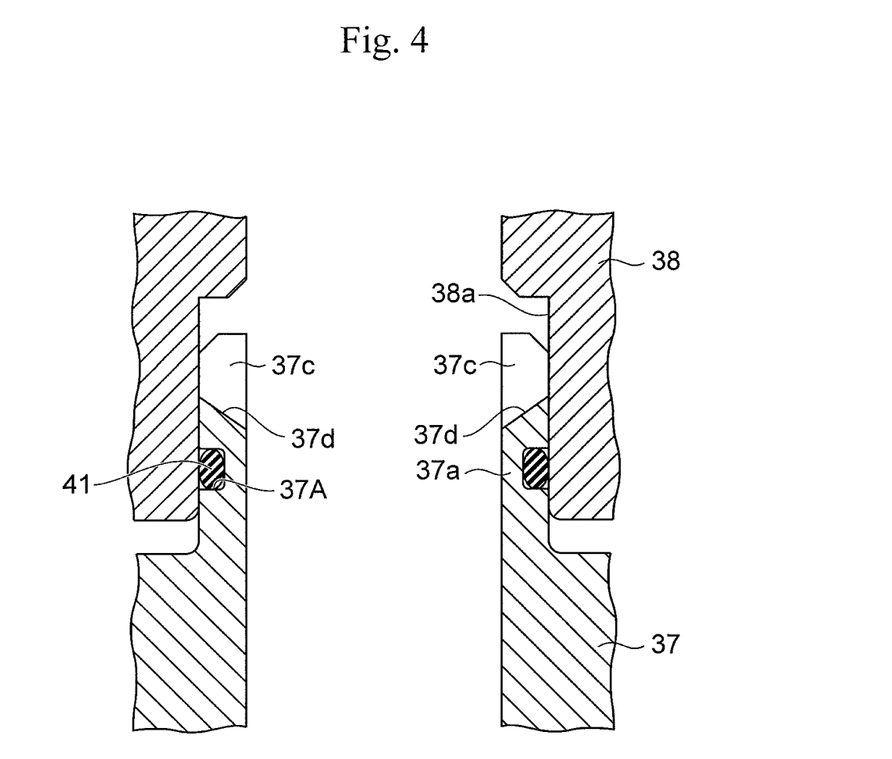
FIG. 4 is an enlarged cross-sectional view of the main part of another example of the portion where the gas-liquid separator and the circulation pump are coupled to each other in the fuel cell module of FIG. 2.
Figure 5:
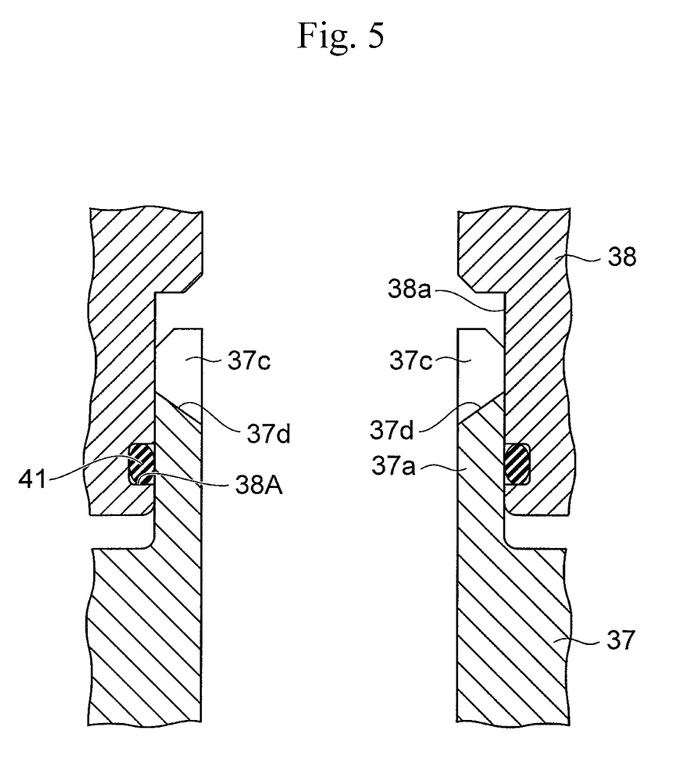
FIG. 5 is an enlarged cross-sectional view of the main part of yet another example of the portion where the gas-liquid separator and the circulation pump are coupled to each other in the fuel cell module of FIG. 2.

In addition, in the aforementioned embodiment, the O-ring 41 as a sealing member is disposed in the housing space 40 that is defined by the step portion 37b (the terrace surface facing up) formed along the outer periphery of the port portion 37a and the step portion 38b (the terrace surface facing down) formed along the inner periphery of the housing portion 38a, but it goes without saying that as shown in FIGS. 4 and 5, for example, the O-ring 41 may be disposed in an annular groove 37A formed along the outer periphery of the port portion 37a or an annular groove 38A formed along the inner periphery of the housing portion 38a.

Although the embodiment of the present disclosure has been described in detail with reference to the drawings, the specific configuration is not limited thereto, and any design changes that may occur within the spirit and scope of the present disclosure are all included in the present disclosure.

DESCRIPTION OF SYMBOLS

1 Fuel cell system
2 Fuel cell module
10 Fuel cells (fuel cell stack)
37 Gas-liquid separator
37a Port portion
37b Step portion
37c Discharge groove
37d Bottom portion of discharge groove
38 Circulation pump
38a Housing portion
38b Step portion
40 Housing space
41 O-ring (sealing member)

What is claimed is:

1. A fuel cell module comprising:
a gas-liquid separator and a circulation pump that are disposed in a circulation channel for refluxing fuel off-gas discharged from fuel cells to the fuel cells, the gas-liquid separator having a cylindrical port portion that projects upward from the gas-liquid separator, the circulation pump having a housing portion that opens downward, the cylindrical port portion being adapted to be inserted into the housing portion so as to define a channel through which the fuel off-gas flows between the gas-liquid separator and the circulation pump,
wherein the port portion is provided with a discharge groove or a discharge hole in a region of from an outer periphery toward an inner periphery of the port portion, and
a bottom portion of the discharge groove or the discharge hole is inclined so as to become lower toward an inner side.

2. The fuel cell module according to claim 1, wherein the port portion has a cylindrical shape, and the discharge groove or the discharge hole is disposed radially in the port portion.

3. The fuel cell module according to claim 1, wherein:
a sealing member adapted to seal between the port portion and the housing portion is disposed in a housing space formed between the port portion and the housing portion, and
the discharge groove or the discharge hole is disposed in a region of from a portion above the housing space on the outer periphery of the port portion toward the inner periphery of the port portion.

4. The fuel cell module according to claim 1, wherein the discharge groove or the discharge hole includes a plurality of discharge grooves or discharge holes that are disposed circumferentially in the port portion.

5. The fuel cell module according to claim 1, wherein the housing portion of the circulation pump is made of metal and the port portion of the gas-liquid separator is made of resin.

* * * * *